Feb. 18, 1969 J. E. INGRAM 3,427,722
PARALLEL RULER
Filed Feb. 13, 1968

JOHN E. INGRAM
INVENTOR.
BY
Robert K. Rhea
AGENT

United States Patent Office 3,427,722

Patented Feb. 18, 1969

3,427,722

PARALLEL RULER

John E. Ingram, 740 87th St., Daly City, Calif. 94015

Filed Feb. 13, 1968, Ser. No. 705,103

U.S. Cl. 33—110 4 Claims

Int. Cl. B43l *13/24*

ABSTRACT OF THE DISCLOSURE

A pair of elongated rules are separably connected by a pair of arms pivotally connected at one end portion in spaced-apart relation to one of the rules. Each arm is provided with a longitudinal slot having a gear rack at one side of the slot. A pair of bolts extending through the other rule and the respective slot journal a pinion in mesh with the respective arm rack. A rack-like bar, having a series of teeth extending longitudinally along one side of each end portion, is longitudinally positioned slidably upon one rule with the teeth thereof engaging the teeth of the respective pinion.

*Background of the invention*

The present invention relates to parallel rules particularly adapted for use in chart navigation.

Parallel rules consisting of two rules linked together which permits one of the rules to assume varying distances from the other while maintaining parallelism with the stationary rule are well known, however, the manner of connecting the rules of most parallel rules presently in use, which consists of a pair of arms pivotally connected in spaced relation to the respective rule, results in a somewhat rotary movement of the movable bar with respect to the stationary bar usually resulting in the necessity of pursuing a zig-zag course across the chart. This invention, on the other hand, connects the rules in such a manner that one rule may be moved straight away from the stationary rule or in a sliding lateral direction, if desired, wherein the rules are maintained parallel. Parallel rules have long been used for chart navigation, plotting courses, bearings, lines of position, course for steering and other uses pertaining to chart navigation, however, as mentioned above, the conventional parallel rule, when moved in a somewhat lateral motion from the stationary rule, required that the back bar be held firmly behind the forward rule and then when necessary the back bar is moved up toward the forward bar to repeat the action resulting in a difficult, slow and frequent slipping of one or the other of the rules particularly when correcting the direction of movement as a result of a zig-zag course necessarily pursued by the conventional parallel ruler. The ruler of this invention, on the other hand, may have one of the rules moved in a straightforward manner or to the right or left and is constructed so that it will cover or span substantially twice the distance each move as compared with most conventional parallel rules.

*Summary of the invention*

A pair of elongated rules are interconnected for parallel movement with respect to each other by a pair of link-like arms pivotally connected in spaced relation at one end to one of the rules. Each of the arms is provided with a longitudinally extending slot which slidably receives a pin secured to the other said rule. Each of the pins journal a pinion in mesh with a rack extending along the depending surface of each arm. A rack-like bar is longitudinally slidably secured to the last mentioned rule in mesh with the respective end portion of the rack bar, thus maintains the rules as an aid in chart navigation. The pinions, being in contact with the respective arm rack and the teeth on the respetcive end portion of the rack bar, thus maintains the rules in parallelism during all movements of the rules toward and away from each other.

It is, therefore, the principal object of this invention to provide parallel rules which are interconnected by rack arms and gear teeth so that one rule may be moved in any direction relative to the other and maintain parallelism.

*Description of the preferred embodiment*

Figures 1, 2:
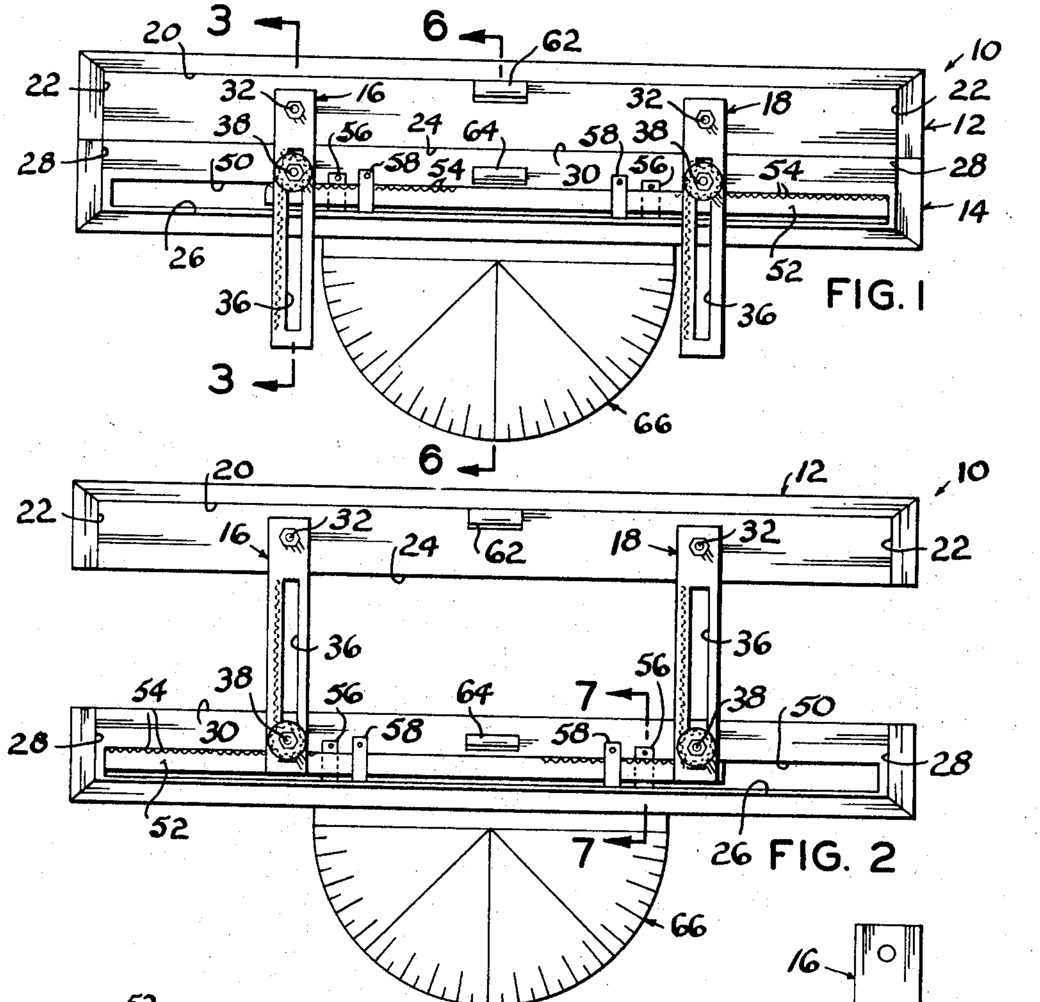
FIGURE 1 is a top view of the device with the rules juxtaposed.
FIGURE 2 is a view similar to FIG. 1 with the rules in extended relation.

Like characters of reference designate like parts in those figures of the drawings in which they occur.

In the drawings:

The reference numeral 10 indicates the device, as a whole, comprising a pair of rules 12 and 14 interconnected by link-like arms 16 and 18. For descriptive purposes the rule 12 will be referred to as the front rule and the rule 14 as the back rule. The front rule 12 is rectangular plate-like in general configuration having a beveled forward and end surfaces 20 and 22, respectively, and a rearward edge 24 parallel with respect to the forward beveled edge 20. The back rule 14 is substantially identical, but opposite, in configuration with respect to the front rule 12 having rearward and end beveled surfaces 26 and 28, respectively, and a front edge 30 parallel with respect to its rearward beveled edge 26.

The arms 16 and 18 are each pivotally connected at one end portion in spaced-apart relation to the front rule 12 by bolts 32 with a spacer 34 interposed between the respective arm and the upper surface of the front rule 12 for the purposes presently apparent. The arms 16 and 18 and their manner of attachment to the rule 14 are identical and in the interest of brevity only the arm 16 will be described in detail. The length of the arm 16 is such that it projects rearwardly beyond the back rule 14 a substantial distance which may be varied as desired for the operation of the device 10 as hereinafter described.

Figures 4, 5:
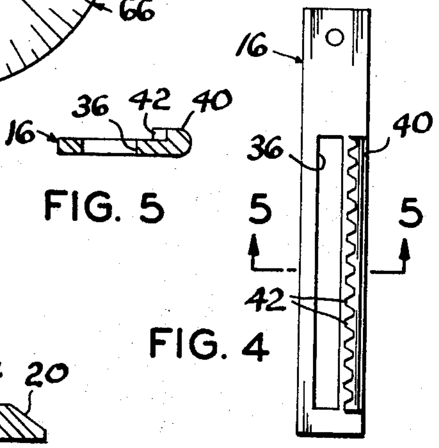
FIGURE 4 is an inverted plan view, to a different scale, of one of the rule connecting arms.
FIGURE 5 is a vertical cross-sectional view, to an enlarged scale, taken substantially along the line 5—5 of FIG. 4.
Figure 3:
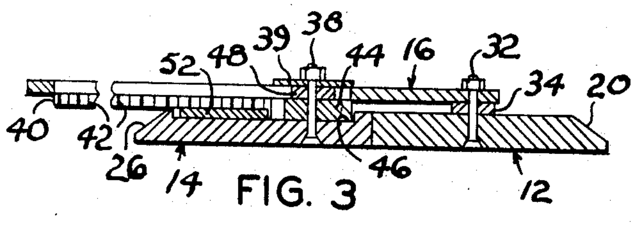
FIGURE 3 is a vertical cross-sectional view, to an enlarged scale, taken substantially along the line 3—3 of FIG. 1.
Figure 6:
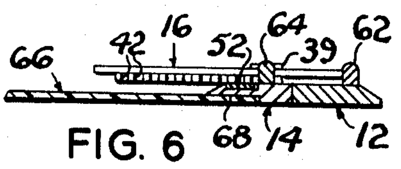
FIGURE 6 is a vertical cross-sectional view taken substantially along the line 6—6 of FIG. 1; and, FIGURE 7 is a fragmentary vertical cross-sectional view, to an enlarged scale, taken substantially along the line 7—7 of FIG. 2.

The arm 16 is provided with a longitudinally extending slot 36 which slidably receives a bolt 38 extended through the back rule 14 and alignedly positioned transversely on the back rule 14 with respect to the position of the bolt 32 on the front rule 12. A slot spanning washer 39 is interposed between the nut of the bolt 38 and the upper surface of the arm 16. The link 16 is provided with a rack 40 on its depending surface having its teeth 42 extending coextensive with the slot longitudinally of the link, as shown more clearly in FIG. 4. FIGURE 5 illustrates the manner of forming this rack wherein a side portion of the link 16, having the teeth 42 formed thereon, is doubled back upon itself so that the teeth face toward the slot 36 in close spaced relation with respect to the adjacent limit of the slot.

A small gear or pinion 44 is journaled by the bolt 38 between the arm 16 and the upper surface of the back rule 14 with its teeth engaged with the teeth 42 of the arm rack 40. The upper surface of the back rule 14 is preferably recessed, as at 46, to reduce the overall height of the device. The overall height of the pinion 44 is substantially twice the thickness of the arm rack 40 so that, in combination wtih the spacer 34, the link 16 is maintained parallel with respect to the plane of the upper surface of the front and back rules 12 and 14. A washer-like roller or spacer 48 is interposed between the pinion 44 and washer 39 and journaled by the bolt 38 with its periphery in contact with opposing wall edges defining the slot 36. Obviously, the spacer 48 may be formed integral with the pinion 44, if desired.

A longitudinally extending rectangular slot or recess 50 is formed in the upper surface of the back rule 14 adjacent its beveled edge 26 for receiving an elongated bar 52 having a series of teeth 54 formed in rack-like fashion at each of its end portions and on that side of the bar facing toward the pinions 44 for cooperative engagement with the teeth of the latter. The length of the bar 52 is substantially less than the length of the slot 50 permitting longitudinal sliding movement of the bar in the manner more fully described hereinbelow.

Figure 7:
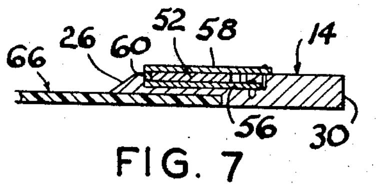

The bar teeth 54 are maintained in cooperative engagement with the teeth of the pinion by under and over lying guides 56 and 58, respectively, secured to the back rule 14 with the guides having an upstanding and depending end portion 60 contacting the side edge of the bar opposite its teeth, only the upstanding end portion 60 of the guide 56 being shown (FIG. 7).

Upstanding projections or finger grip bars 62 and 64 are, respectively, secured to the front and back rules medially their ends for operating the parallel ruler as hereinafter described.

A conventional protractor 66 is secured to the back rule 14 medially its ends and projects rearwardly of its beveled edge 26. The depending surface of the back rule 14 is preferably recessed, as at 68, for receiving the forward edge surface of the protractor so that its depending surface will lie in the plane of the depending surface of the rules 12 and 14.

*Operation*

The ruler 10 is positioned on a chart, not shown, and the back rule 14 is manually held stationary while the front rule 12 is manually moved away from the back rule 14 as by means of the projection 62. Since the pinions 44 are engaged with the arm rack teeth 42 and the bar teeth 54, the movement of the front rule 12 away from the back rule 14 is synchronized by the pinions 44 so that the front rule 12 is maintained parallel with respect to the back rule 14 during all movement of the front rule 12 toward or away from the back rule 14. Movement of the front rule 12 away from the back rule 14 rotates the pinions 44 clockwise, as viewed in FIGS. 1 and 2, as the teeth of the pinions move along the arm rack teeth 42 which results in the pinions pulling or moving the bar 52 toward the left, as viewed in FIG. 1. The extension or spacing of the front rule 12 away from the back rule 14 is limited by the length of the slots 36 and when the rules 12 and 14 are in their maximum spaced-apart relation the bar 52 has been moved to the limit of its sliding movement toward the left, as shown in FIG. 2. When the front rule 12 has been extended to the limit allowed by the arms 16 and 18, the front rule 12 may be held stationary and the back rule 14 moved toward the front rule which rotates the pinions in a counter-clockwise operation, as viewed in FIGS. 1 and 2, and moves the bar 52 toward the right.

Obviously, the invention is susceptible to some change or alteration without defeating its practicability, and I therefore do not wish to be confined to the preferred embodiment shown in the drawings and described herein, further than I am limited by the scope of the appended claims.

I claim:

1. A parallel ruler, comprising: a pair of rules; a pair of arms pivotally connected at one end in spaced-apart relation to one said rule, each said arm having a longitudinally extending slot; a pair of bolts connected with the other said rule and respectively projecting through the slot in each said arm; a pinion underlying each said arm and journaled by the respective said bolt for rotation about a vertical axis; an arm rack having teeth facing toward and coextensive with the slot in each said arm adjacent the depending surface thereof, the teeth of each said arm rack being cooperatively engaged with the respective said pinion and maintaining said rules in parallel relation during movement toward and away from each other.

2. Structure as specified in claim 1 in which said rack and pinion means further includes an elongated bar slidably disposed longitudinally on said other rule, said bar having a series of teeth, forming a bar rack, at its respective end portions facing toward and cooperatively engaged with the respective said pinion; and means maintaining said bar on said other rule.

3. Structure as specified in claim 2 in which the last mentioned means comprises guides secured to said other rule, said guides slidably contacting the respective upper and lower surfaces of said bar, said other rule having a longitudinally extending recess in its upper surface cooperatively nesting said bar.

4. Structure as specified in claim 3 and a protractor secured to one said rule and projecting laterally thereof.

References Cited

UNITED STATES PATENTS

| | | | |
|---|---|---|---|
| 46,348 | 2/1865 | Gillette | 33—108 |
| 544,787 | 8/1895 | Heath | 33—108 |
| 1,746,537 | 2/1930 | Knechtel | 33—108 |
| 2,394,619 | 2/1946 | Lenz | 33—108 |

HARRY N. HAROIAN, *Primary Examiner.*

U. S. Cl. X.R.

74—110